United States Patent
Zhu

(10) Patent No.: US 10,581,674 B2
(45) Date of Patent: Mar. 3, 2020

(54) METHOD AND APPARATUS FOR EXPANDING HIGH-AVAILABILITY SERVER CLUSTER

(71) Applicant: Alibaba Group Holding Limited, Grand Cayman (KY)

(72) Inventor: Xiaoping Zhu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 239 days.

(21) Appl. No.: 15/469,062

(22) Filed: Mar. 24, 2017

(65) Prior Publication Data

US 2017/0279674 A1    Sep. 28, 2017

(30) Foreign Application Priority Data

Mar. 25, 2016  (CN) .......................... 2016 1 0179486

(51) Int. Cl.
*H04L 12/24* (2006.01)
*H04L 29/08* (2006.01)
*H04L 12/751* (2013.01)

(52) U.S. Cl.
CPC ...... *H04L 41/0806* (2013.01); *H04L 41/0896* (2013.01); *H04L 41/14* (2013.01); *H04L 41/5012* (2013.01); *H04L 67/10* (2013.01); *H04L 41/0695* (2013.01);
(Continued)

(58) Field of Classification Search
None
See application file for complete search history.

(56) References Cited

U.S. PATENT DOCUMENTS

| | | | |
|---|---|---|---|
| 2002/0116593 A1* | 8/2002 | Kazar | G06F 16/13 711/202 |
| 2003/0046394 A1 | 3/2003 | Goddard et al. | |
| 2004/0103244 A1 | 5/2004 | Fujimoto et al. | |

(Continued)

FOREIGN PATENT DOCUMENTS

| | | |
|---|---|---|
| CN | 102571772 A | 7/2012 |
| CN | 102664914 A | 9/2012 |

(Continued)

OTHER PUBLICATIONS

PCT Search Report and Written Opinion dated Jun. 15, 2017 for PCT Application No. PCT/US17/24061, 10 pages.

(Continued)

*Primary Examiner* — Brian Whipple
(74) *Attorney, Agent, or Firm* — Lee & Hayes, P.C.

(57) ABSTRACT

A method for expanding a high-availability server cluster is disclosed. The method includes configuring at least two nodes comprised in a server cluster to be expanded as one or more server units, each server unit consisting of at least two nodes; configuring a newly added node into the server cluster, and configuring the newly added node as at least one newly added server unit in the server cluster; and broadcasting routing information of the newly added server unit. The method realizes an expansion of a server cluster by adding a newly added server unit to the server cluster, i.e., increasing the number of server units in the server cluster, so that the number of sessions and processing performance of the expanded server cluster can be improved, with a relatively low expansion cost.

18 Claims, 10 Drawing Sheets

(52) U.S. Cl.
CPC ......... *H04L 41/5096* (2013.01); *H04L 45/02* (2013.01); *H04L 67/1004* (2013.01)

(56) References Cited

U.S. PATENT DOCUMENTS

| | | |
|---|---|---|
| 2005/0005006 A1* | 1/2005 | Chauffour ........... H04L 67/1027 709/223 |
| 2005/0237926 A1* | 10/2005 | Cheng ................ H04L 43/0817 370/216 |
| 2006/0190581 A1* | 8/2006 | Hagale .................. G06F 9/5061 709/223 |
| 2007/0288652 A1* | 12/2007 | Carter .................. H04L 45/306 709/241 |
| 2008/0198757 A1* | 8/2008 | Dan .................... H04L 41/5009 370/252 |
| 2008/0320121 A1* | 12/2008 | Altaf .................... H04L 67/322 709/224 |
| 2009/0138615 A1 | 5/2009 | Cristallo et al. |
| 2009/0144800 A1* | 6/2009 | Black-Ziegelbein ........................ G06F 21/604 726/1 |
| 2010/0228819 A1 | 9/2010 | Wei |
| 2011/0246813 A1 | 10/2011 | Collier et al. |
| 2014/0019421 A1* | 1/2014 | Jagadeesan ......... G06F 11/1469 707/687 |
| 2014/0156789 A1 | 6/2014 | Kolesov et al. |
| 2015/0046586 A1 | 2/2015 | Zhang et al. |
| 2015/0229775 A1 | 8/2015 | Kamboh et al. |
| 2015/0254325 A1 | 9/2015 | Stringham |
| 2016/0269501 A1* | 9/2016 | Usgaonkar .......... H04L 67/2842 |

FOREIGN PATENT DOCUMENTS

| | | |
|---|---|---|
| CN | 103294785 A | 9/2013 |
| CN | 105162878 A | 12/2015 |

OTHER PUBLICATIONS

Translation of CN Office Action from Corresponding CN Application No. 201610179486.9 dated Aug. 29, 2019, a foreign counterpart application for U.S. Appl. No. 15/469,062 , 8 pages.

Translation of CN Office Action from Corresponding CN Application No. 201610179486.9 dated Aug. 21, 2019, a counterpart foreign application for U.S. Appl. No. 15/469,062 , 2 pages.

The Extended European Search Report dated Oct. 9, 2019 for European Patent Application No. 17771249.4, 8 pages.

* cited by examiner

METHOD AND APPARATUS FOR EXPANDING HIGH-AVAILABILITY SERVER CLUSTER

CROSS REFERENCE TO RELATED PATENT APPLICATION

This application claims foreign priority to Chinese Patent Application No. 201610179486.9 filed on Mar. 25, 2016, entitled "Method and Apparatus for Expanding High-Availability Server Cluster", which is hereby incorporated by reference in its entirety.

TECHNICAL FIELD

The present disclosure relates to the field of server cluster technologies, and particularly to methods for expanding a high-availability server cluster. The present disclosure also relates to apparatuses for expanding a high-availability server cluster.

BACKGROUND

In an era of increasingly frequent interactions of information, requirements for servers that provide data services such as data processing and data storage have become more stringent. As the number of users increases, data information of such a massive number of users also grows continuously, and thus the load pressure of the servers increases. The load pressure of the servers can be reduced by upgrading the configuration of the servers. However, the service capability of a single server is ultimately limited. Under these circumstances, a cluster technology emerges and becomes an effective solution. Using the cluster technology, the performance, reliability, and flexibility can be highly enhanced with a relatively low cost, and task scheduling is the core of the cluster technology. By assembling multiple servers into a server cluster to provide external services jointly, the server cluster can perform parallel computing using multiple servers, thus obtaining a very high computing speed while lowering the load pressure of each single server. The servers in the server cluster can back up each other, so that the server cluster can still operate normally when any one of the servers fails, thereby achieving the high availability of the server cluster. An example includes a Server Load Balancer (SLB) cluster provided by Aliyun, which is a typical server cluster. As shown in FIG. 1, an SLB service virtualizes multiple cloud servers (Node) resources located in a same region into a high-performance and high-availability cloud server pool (i.e., a server cluster) by setting a Virtual IP Address (VIP), and distributes sessions from client terminals to the cloud server pool according to a specified manner. Meanwhile, the SLB service checks a health status of each cloud server in the cloud server pool, and automatically isolate a cloud server in an abnormal state, thereby solving a single-point issue associated with a single cloud server, and improving an overall service capability of the cloud server pool. A SLB cluster is made up of three parts: a cloud server pool, a load balancing system, and a control system. The load balancing system thereof is used for distributing sessions of client terminals to available cloud servers in the cloud server pool, and the control system thereof is used for configuring and monitoring the load balancing system.

All current server clusters are high-availability server clusters formed by at least two servers, and have a load balancing function. For example, sessions from a same client terminal (a same IP address) are distributed to multiple servers in a server cluster. Furthermore, the current server clusters have high availability. Sessions on a server in a server cluster may be synchronized to other servers, and the sessions would be automatically switched to another server if that server fails, thus ensuring that the sessions may not be interrupted and terminated. However, since the number of sessions is synchronized among all servers in this type of server cluster, the number of sessions of the server cluster is equal to the number of sessions of a server in the server cluster, and the session capacity of the server cluster is limited by the session capacity of one server. Therefore, when this type of server cluster is expanded, only processing performance of the server cluster can be increased, and the number of sessions of the server cluster cannot be increased. When the number of sessions of the server cluster is insufficient, the only option is to establish a new server cluster to meet the demand of the increasing number of sessions. As the cost of establishing a new server cluster is relatively high, the cost of managing the server cluster is also increased correspondingly.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method for expanding a high-availability server cluster to solve the problem of relatively high costs when an existing server cluster is expanded.

The present disclosure also relates to an apparatus for expanding a high-availability server cluster.

The present disclosure provides a method for expanding a high-availability server cluster. In implementations, the method may include configuring at least two nodes included in a server cluster to be expanded as one or more server units, each server unit being formed by at least two nodes; configuring a newly added node into the server cluster, and configuring the newly added node as at least one newly added server unit in the server cluster; and posting routing information of the newly added server unit.

In implementations, prior to configuring the at least two nodes included in the server cluster to be expanded as the one or more server units, the method may further include determining whether a performance parameter of the server cluster is greater than a preset performance parameter threshold based on the performance parameter; configuring the at least two nodes included in the server cluster to be expanded as the one or more server units if affirmative; or returning to the operation of determining whether the performance parameter is greater than the preset performance parameter threshold based on the performance parameter otherwise.

In implementations, the performance parameter may include a number of sessions and/or a load pressure.

In implementations, a respective unit identifier is set for each server unit, and a corresponding unit identifier is set for each newly added server unit.

In implementations, for a node or newly added node to be synchronized in the server cluster, the method further include determining whether a unit identifier of a server unit or newly added server to which the node or newly added node to be synchronized belongs is the same as a unit identifier of a server unit or newly added server to which a synchronized node or newly added node belongs; synchronizing a session and corresponding data on the synchronized node or newly added node to the node or newly added node to be synchronized if affirmative; or returning to the operation of determining whether the unit identifier of the server unit or newly added server to which the node or newly added node to be synchronized belongs is the same as the unit identifier of the server unit or newly added server to which the synchronized node or newly added node belongs, otherwise.

In implementations, after posting the routing information of the newly added server unit, the method may further include posting routing information of the server unit.

In implementations, routing information of each server unit in the server cluster may include respective routing configuration information of each node included in the server unit, and routing information of a disaster recovery unit of the server unit.

Correspondingly, the routing information of each newly added server unit may include respective routing configuration information of each newly added node included in the newly added server unit, and routing information of a disaster recovery unit of the newly added server unit.

In implementations, the routing configuration information may include an IP address.

In implementations, IP addresses included in respective routing configuration information of nodes belonging to a same server unit are the same IP address.

Correspondingly, IP addresses included in respective routing configuration information of newly added nodes belonging to a same newly added server unit are the same IP address.

In implementations, the routing information of each server unit in the server cluster may further include a routing priority of a first respective node in the server unit and a routing priority of a second respective node in the server unit.

Correspondingly, the routing information of each newly added server unit may further include a routing priority of a third respective node in the newly added server unit and a routing priority of a fourth respective node in the newly added server unit.

In implementations, the routing priority of the first respective node in the server unit is higher than the routing priority of the second respective node in the server unit.

Correspondingly, the routing priority of the third respective node in the newly added server unit is higher than the routing priority of the fourth respective node in the newly added server unit.

In implementations, the disaster recovery unit of the server unit may include any server unit in the server cluster other than the server unit, or any newly added server unit.

Correspondingly, the disaster recovery unit of the newly added server unit may include any server unit in the server cluster except the newly added server unit, or any newly added server unit.

In implementations, a number of nodes included in each server unit in the server cluster may be identical.

In implementations, a number of newly added nodes included in each newly added server unit in the server cluster may be the same.

In implementations, a number of nodes included in each server unit is equal to a number of newly added nodes included in each newly added server unit.

In implementations, a number of server units in the server cluster is one, and each time when the operation of configuring a newly added node into the server cluster, and configuring the newly added node as at least one newly added server unit in the server cluster is performed, a number of newly added server units in the server cluster is increased by one.

The present disclosure further provides an apparatus for expanding a high-availability server cluster. In implementations, the apparatus may include a server unit configuration unit configured to configure at least two nodes included in a server cluster to be expanded as one or more server units, each server unit consisting of at least two nodes; a newly added server unit configuration unit configured to configure a newly added node into the server cluster, and configuring the newly added node as at least one newly added server unit in the server cluster; and a routing information posting unit configured to post routing information of the newly added server unit.

In implementations, the apparatus for expanding a high-availability server cluster may further include an expansion determination unit configured to determine whether a performance parameter of the server cluster is greater than a preset performance parameter threshold based on the performance parameter.

If affirmative, the server unit configuration unit, the newly added server unit configuration unit, and the routing information posting unit are run.

If not, the expansion determination unit is run.

In implementations, a respective unit identifier is set for each server unit, and a corresponding unit identifier is set for each newly added server unit.

In implementations, for each node to be synchronized or newly added node in the server cluster, a synchronization determination unit is run.

The synchronization determination unit is configured to determine whether a unit identifier of a server unit or newly added server to which the node to be synchronized or newly added node belongs is the same as a unit identifier of a server unit or newly added server to which a synchronized node or newly added node belongs.

If affirmative, a synchronization unit is run.

The synchronization unit is configured to synchronize a session and corresponding data on the synchronized node or newly added node to the node to be synchronized or newly added node.

If not, the synchronization determination unit is run.

In implementations, the apparatus for expanding a high-availability server cluster may further include a second routing information posting unit configured to post routing information of the server unit.

The disclosed method includes configuring at least two nodes included in a server cluster to be expanded as one or more server units, each server unit consisting of at least two nodes; configuring a newly added node into the server cluster, and configuring the newly added node as at least one newly added server unit in the server cluster; and posting routing information of the newly added server unit.

When expanding a server cluster to be expanded, the disclosed method configures at least two nodes deployed in the server cluster as one or more server units each consisting of at least two nodes. After configuration of the nodes deployed in the server cluster is finished, the method configures a newly added node into the server cluster and configures the newly added node as at least one newly added server unit in the server cluster, to implement deployment of the newly added server unit into the server cluster. By posting routing information of the newly added server unit, the newly added server unit implements the same function as the one or more server units in the server cluster. In this way, the number of sessions and the processing performance of the expanded server cluster can be improved, and the expansion cost is relatively low.

DETAILED DESCRIPTION

Details are illustrated in the following description to facilitate a full understanding of the present disclosure. However, the present disclosure can be implemented in a number of other manners that are different from those described herein. One skilled in the art can make similar generalizations without departing from the connotation of the present disclosure. Therefore, the present disclosure is not limited to exemplary implementations disclosed herein.

The present disclosure provides a method for expanding a high-availability server cluster, and an apparatus for expanding a high-availability server cluster.

The method and apparatus are described successively hereinafter with reference to the accompanying drawings of the embodiments provided in the present disclosure.

First Embodiment

Figure 1:
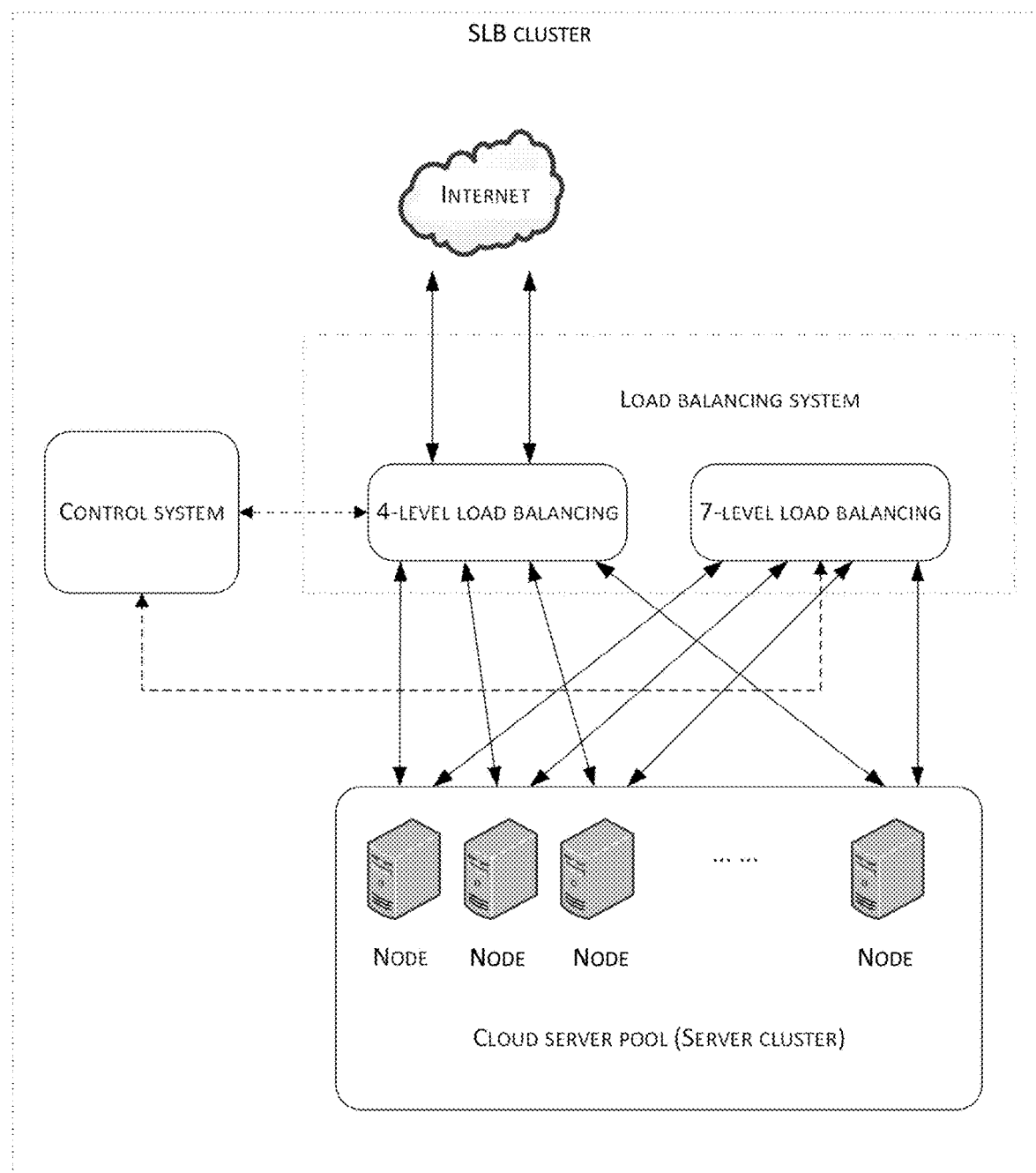
FIG. 1 is a schematic diagram of an SLB cluster.
Figure 2:
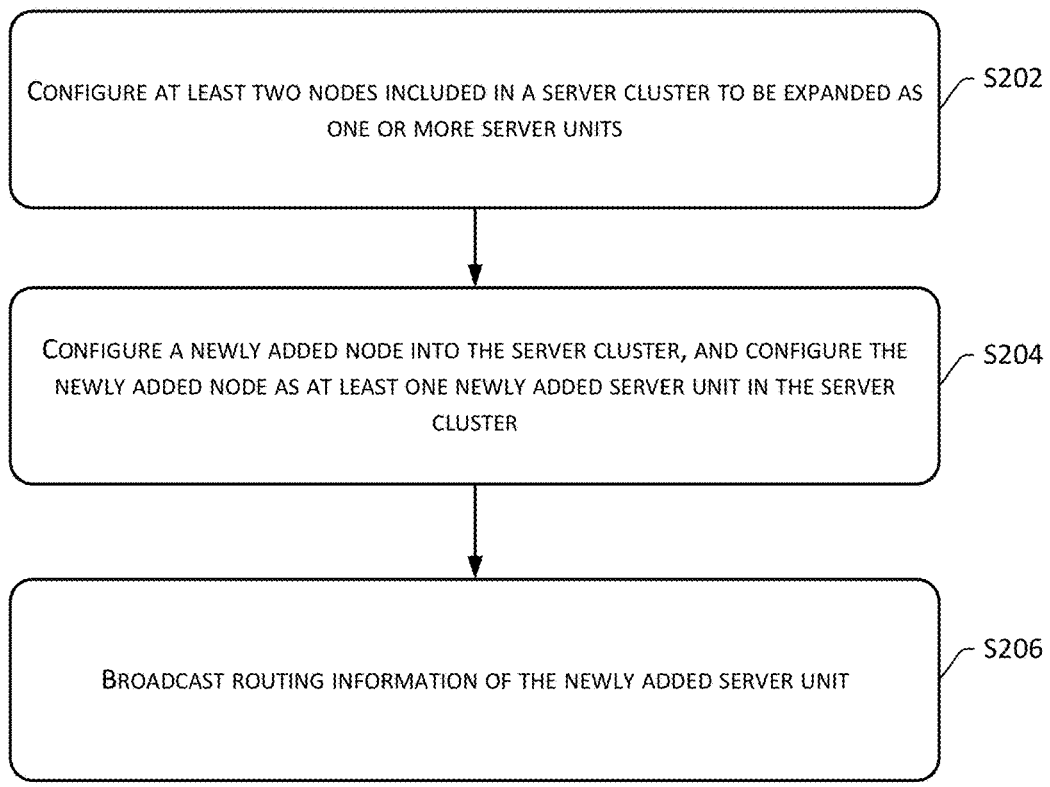
FIG. 2 is a flowchart of a first example method for expanding a high-availability server cluster according to the present disclosure.
Figure 3:
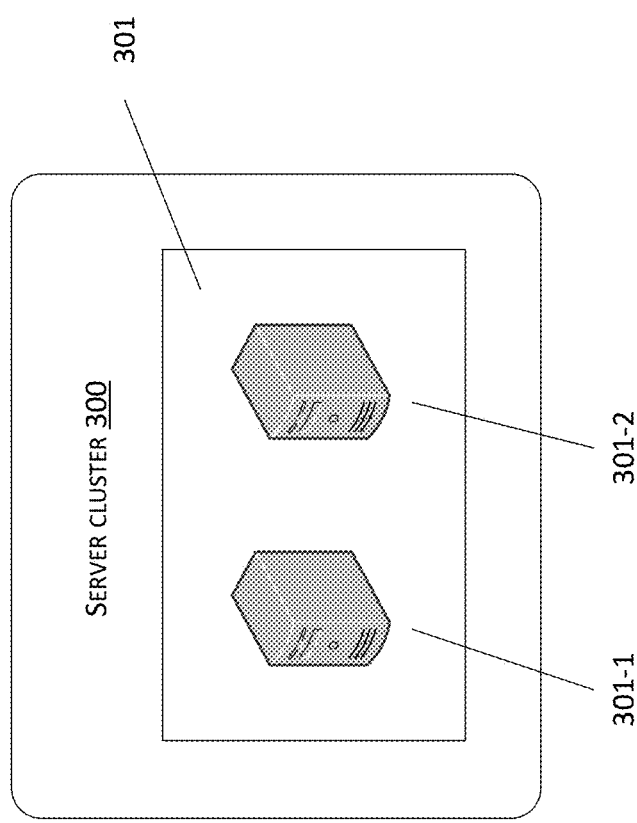
FIG. 3 is a schematic diagram of a first high-availability server cluster according to the present disclosure.
Figure 4:
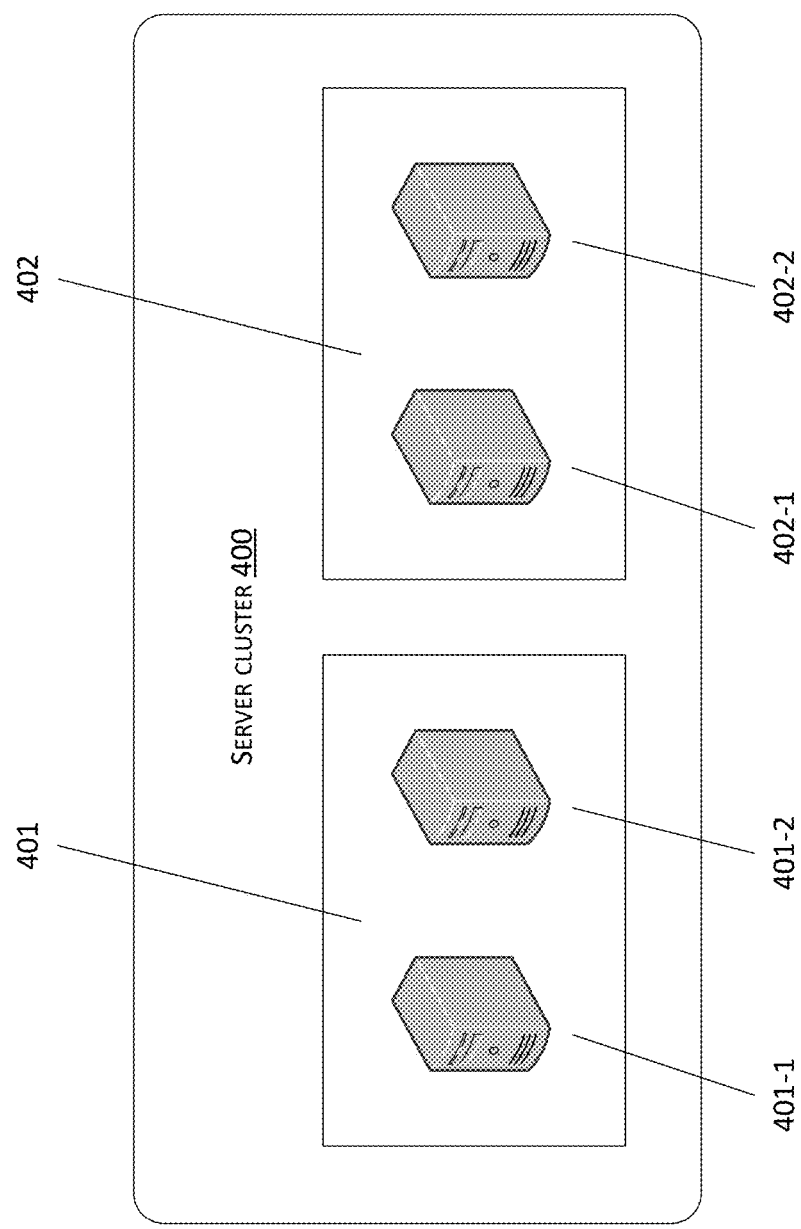
FIG. 4 is a schematic diagram of a second high-availability server cluster according to the present disclosure.
Figure 5:
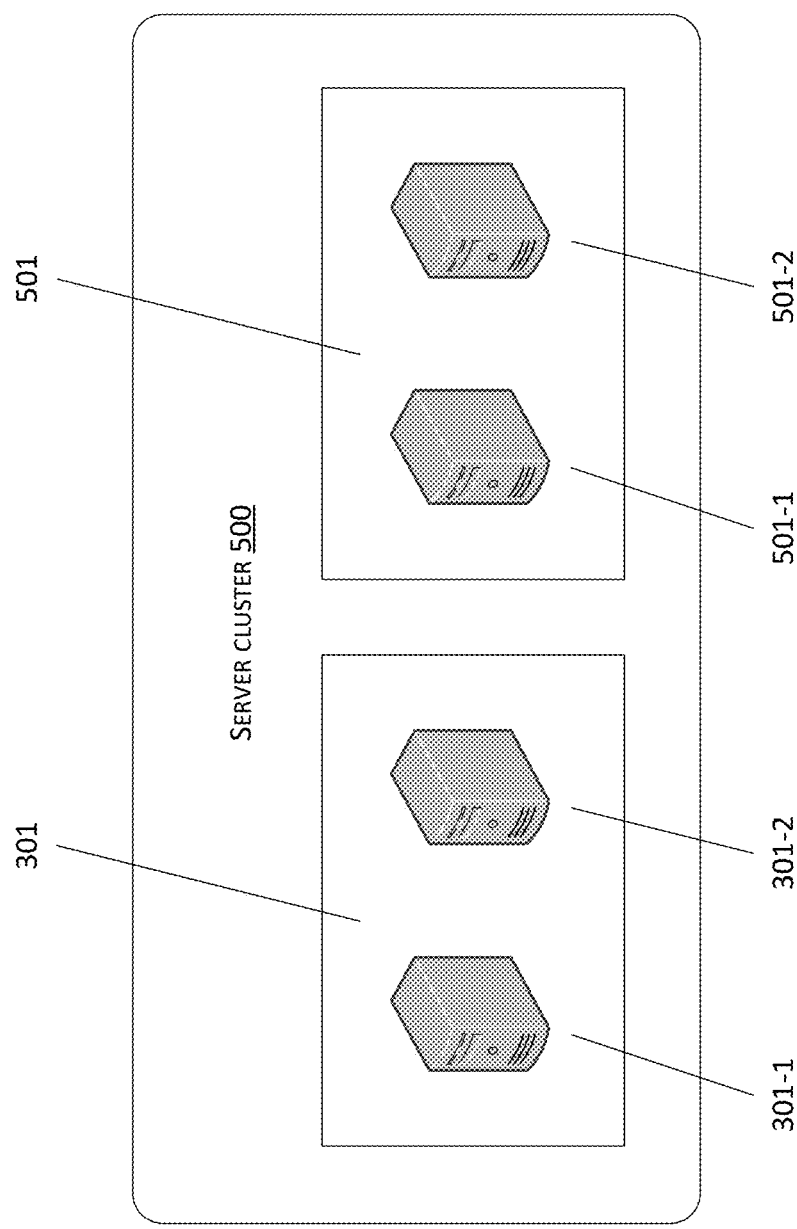
FIG. 5 is a schematic diagram of a third high-availability server cluster according to the present disclosure.
Figure 6:
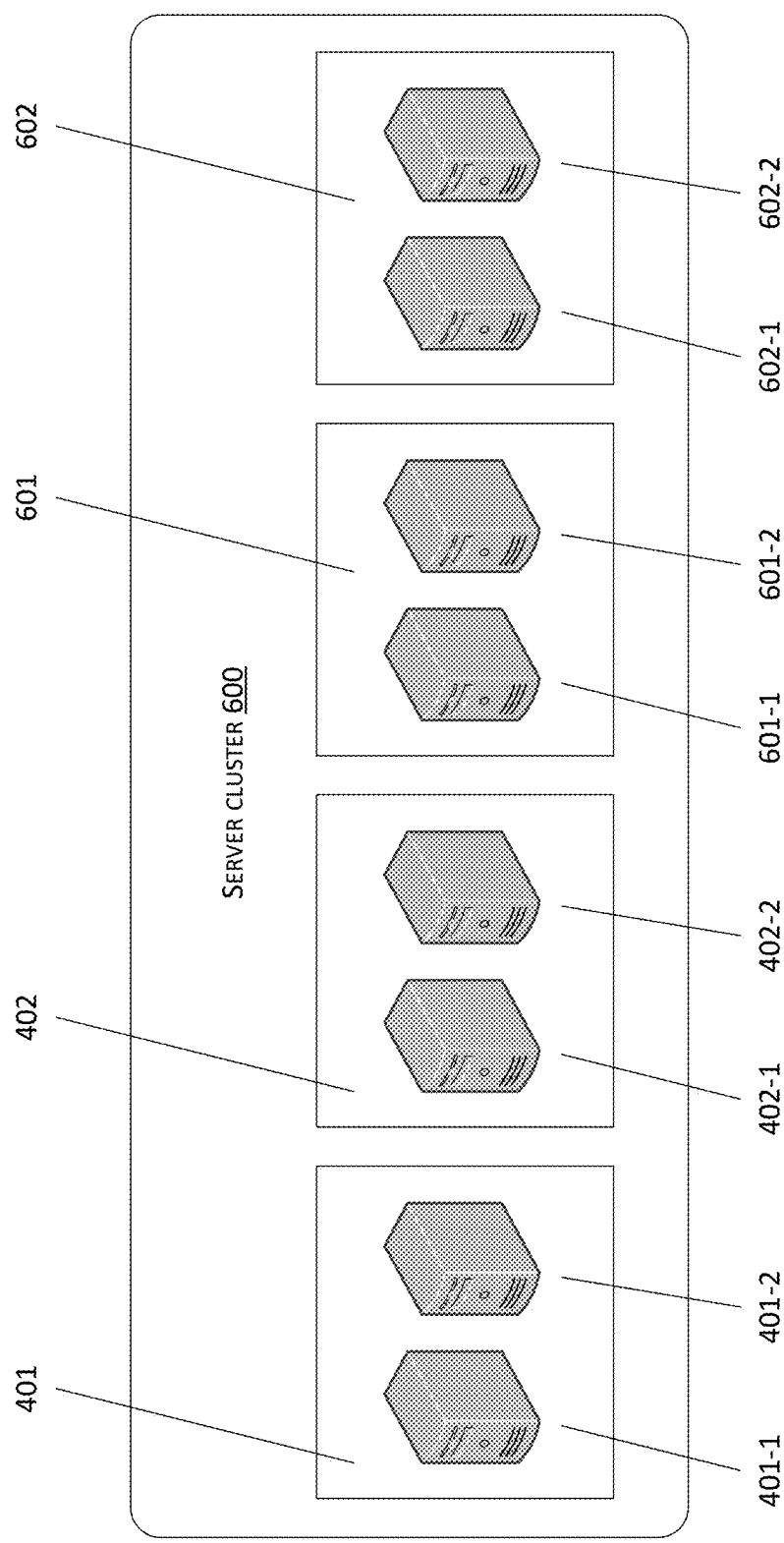
FIG. 6 is a schematic diagram of a fourth high-availability server cluster according to the present disclosure.

Referring to FIG. 2 to FIG. 6, FIG. 2 shows a flowchart of a first example method for expanding a high-availability server cluster according to the present disclosure. FIG. 3 shows a schematic diagram of a first high-availability server cluster 300 according to the present disclosure. FIG. 4 shows a schematic diagram of a second high-availability server cluster 400 according to the present disclosure. FIG. 5 shows a schematic diagram of a third high-availability server cluster 500 according to the present disclosure. FIG. 6 shows a schematic diagram of a fourth high-availability server cluster 600 according to the present disclosure.

FIG. 2 shows a flowchart of a first example method 200 for expanding a server cluster according to the present disclosure. In addition, a relationship among operations in the method 200 for expanding a high-availability server cluster can be determined with reference to FIG. 2.

S202 configures at least two nodes included in a server cluster to be expanded as one or more server units.

In implementations, a server cluster refers to a server cluster formed by multiple nodes (i.e., servers) assembled together. When providing services externally, the server cluster may perform parallel processing using the multiple nodes, thus obtaining a very high processing speed while lowering load pressure of each single node in the server cluster.

Each server unit in the server cluster is formed by at least two nodes. For example, a server unit 301 is formed by a node 301-1 and a node 301-2 in the server cluster 300 as shown in FIG. 3.

In the server cluster, all nodes included in each server unit are in an active state, and can undertake traffic from client terminal(s) to provide data services such as data processing and data storage. For example, the node 301-1 undertakes traffic from an IP address 1.1.1.1, processes a session from the IP address 1.1.1.1, and sends a corresponding session response through the IP address 1.1.1.1 in the server cluster 300 as shown in FIG. 3.

In implementations, a unit identifier is set individually for each server unit. For example, a corresponding unique group id is set for each server unit in the server cluster respectively.

In addition, synchronization of session(s) may be performed between nodes that are included in a server unit in the server cluster, and persistence of the session(s) can be implemented based on the synchronization of the session(s). Furthermore, when a node in the server cluster fails (e.g., a server crashes), session(s) on the failed node may be automatically switched to other node(s) in an active state, thus ensuring that the session(s) is/are not interrupted and terminated, which is an advantage of session synchronization. In implementations, the session synchronization performed between the nodes is different from existing technologies. Specifically, session synchronization is performed only between nodes included in each server unit, and session synchronization is not performed between nodes belonging to different server units. An implementation thereof may use the following approach.

For each node or newly added node to be synchronized in the server cluster, the following operations are executed:
    determining whether a unit identifier of a server unit or newly added server to which the node or newly added node to be synchronized belongs is the same as a unit identifier of a server unit or newly added server to which a synchronized node or newly added node belongs;
    synchronizing a session and corresponding data on the synchronized node or newly added node to the node or newly added node to be synchronized if affirmative; or
    returning and repeating to perform the operation of determining whether a unit identifier of a server unit or newly added server to which the node or newly added node to be synchronized belongs is the same as a unit identifier of a server unit or newly added server to which a synchronized node or newly added node belongs if not.

For each server unit in the server cluster, a node included in the server unit is referred to as a node to be synchronized if waiting for a subsequent session synchronization operation upon being allocated with a session. A node in the server unit having the session not been synchronized and is synchronized in the subsequent session synchronization operation is a synchronized node.

As described above, session synchronization is maintained between nodes included in each server unit in the server cluster, based on the foregoing session synchronization operation. When any node in a server unit fails, traffic on the failed node may be automatically switched to node(s) in an active state, ensuring that connections of already established sessions are not interrupted, and thereby guaranteeing the high availability of the server unit. For example, if the node 301-1 in the server unit 301 fails, the traffic from the IP address 1.1.1.1 undertaken by the node 301-1 is automatically switched to the node 301-2.

In real applications, a number of different implementations may be employed to implement an operation of session synchronization between nodes included in a server unit. Different forms of variations of an operation of session synchronization between nodes included in a server unit are merely modifications of exemplary implementations, which do not depart from the core of the present disclosure, and therefore all fall in the scope of protection of the present disclosure.

In implementations, the number of nodes in a server unit in the server cluster is deployed according to the demand on the server cluster in an actual use. If he actual demand has a relatively high requirement on the processing performance of the server cluster, more nodes may be deployed in the server unit. The number of nodes is set as a larger value, so that the processing performance of the deployed server cluster is higher. If the actual demand has a relatively low requirement on the processing performance of the server cluster, the number of nodes may be set as a smaller value. Similarly, the number of server units in the server cluster may also be deployed according to the demand on the server cluster in an actual use, and may also be set as a larger or smaller value.

In addition, the server units in the server cluster may be deployed with a same number of nodes, or may have a respective number of nodes different from one another. In implementations, the same-node configuration helps to realize disaster recovery between server units in the server cluster and to avoid a defect that a server unit in an active state cannot bear the traffic undertaken by a failed server unit after the traffic is switched to the server unit in the active state. For example, the server unit in the active state may be overloaded or even crashes down because the number of nodes deployed in the failed server unit is greater than the number of nodes deployed in the server unit in the active state. Therefore, in implementations, the number of nodes in each server unit in the server cluster is the same.

On the foregoing basis, in implementations, the number of server units deployed in the server cluster may be set as one to avoid a waste of resources. If the requirement on the processing performance of the server cluster in an actual use cannot be met, the number of server units in the server cluster may be increased through expansion, to meet the specific requirement on the server cluster in the actual use.

Furthermore, in implementations, the number of nodes included in a server unit is set as a minimum value of two to avoid a waste of resources. Session synchronization can be implemented based on a minimum of two nodes, thus guaranteeing the high availability of the server unit. Correspondingly, if the requirement on the processing performance of the server cluster cannot be met in an actual use, the number of server units in the server cluster may be increased through expansion, to increase the number of nodes included in the server unit, thereby fulfilling the specific requirement on the server cluster in the actual use.

It should be noted that the foregoing description of setting the number of server units in the server cluster as one and setting the number of nodes included in the server unit is merely a way of saving resources, and the numbers are not limited herein. It is possible that requirements on the processing performance of a server cluster in various use scenarios may be met. In these situations, multiple server units may be set in a server cluster, and three or more than three nodes may also be set in a server unit, which is not limited herein.

For example, the number of server units is set as two, namely, a server unit 401 and a server unit 402, in a server cluster 400 as shown in FIG. 4. In addition, each of the server unit 401 and the server unit 402 is configured to include two nodes. The nodes included in the server unit 401 are a node 401-1 and a node 401-2, and nodes included in the server unit 402 are a node 402-1 and a node 402-2.

In implementations, if the number of server units deployed in the server cluster is greater than or equal to two, disaster recovery may be implemented between server units. When any server unit fails, traffic handled by the failed server unit may be switched to server unit(s) in an active state, thereby guaranteeing the high availability of traffic in the server cluster. For each server unit in the server cluster, a disaster recovery unit of the server unit may include any server unit in the server cluster other than the server unit or any newly added server unit.

In implementations, if the number of server units deployed in the server cluster is two, the server units may be set to be a disaster recovery unit of each other. For example, the server unit 402 in the server cluster 400 as shown in FIG. 4 is set to be a disaster recovery unit of the server unit 401, and the server unit 401 is set to be a disaster recovery unit of the server unit 402.

If the number of server units deployed in the server cluster is greater than two, the server units may be ordered sequentially according to respective unit identifiers thereof, and a latter server unit is successively set to be a disaster recovery unit of a former server unit, and the first server unit is set to be a disaster recovery unit of the last server unit.

In implementations, the disaster recovery unit may also be implemented by setting routing priorities. For example, the server unit 402 is configured as a disaster recovery unit of the server unit 401 in the server cluster 400 as shown in FIG. 4, which is implemented by setting a low-priority route associated with the server unit 402 in routing information of the server unit 401. Since a routing priority of the server unit 401 is higher than a routing priority of the server unit 402, traffic is preferentially taken up by the server unit 401. The traffic taken up by the server unit 401 is switched to the server unit 402 only when the server unit 401 fails.

In implementations, an operation of expansion determination for the server cluster may also be performed prior to the current operation (i.e., S202). In implementations, the operation of expansion determination may be implemented as follows:

determining whether a performance parameter of the server cluster is greater than a preset performance parameter threshold based on the performance parameter;

performing the current operation to expand the server cluster if affirmative; and returning and performing the operation of determining whether a performance parameter of the server cluster is greater than a preset performance parameter threshold based on the performance parameter if not.

In implementations, the performance parameter may include the number of sessions and/or load pressure.

In real applications, a number of different implementations may be employed to implement the operation of expansion determination. Different forms of variations of the operation of expansion determination are merely modifications of exemplary implementations, and do not depart from the core of the present disclosure, which therefore all fall in the scope of protection of the present disclosure.

S204 configures a newly added node into the server cluster, and configures the newly added node as at least one newly added server unit in the server cluster.

As described above, as the requirements on the processing performance of the server cluster in actual uses incessantly increases, the server cluster may be expanded by increasing the number of server units in the server cluster to meet the actual requirements, thereby improving the processing performance of the server cluster to fulfill the requirements on the processing performance of the server cluster in real applications. In this operation, a node that is newly added (i.e., a newly added node) is deployed into the server cluster to be expanded, and the newly added node is configured as at least one server unit that is newly added, i.e., a newly added server unit.

For example, in a server cluster 500 as shown in FIG. 5, a new server unit 501 is added on a basis of the server cluster 300 as shown in FIG. 3, and the newly added server unit 501 consists of a newly added node 501-1 and a newly added node 501-2.

For example, in a server cluster 600 as shown in FIG. 6, two new server units, namely, a new server unit 601 and a new server unit 602, are added on a basis of the server cluster 400 as shown in FIG. 4. The newly added server unit 601 consists of a newly added node 601-1 and a newly added node 601-2, and the newly added server unit 602 consists of a newly added node 602-1 and a newly added node 602-2.

The newly added node is essentially the same as the nodes included in the server unit of the server cluster, and a difference therebetween is that the nodes included in the server unit are nodes deployed in the server cluster before expansion, and the newly added node is a node added during the expansion. There is no essential difference therebetween.

Correspondingly, the newly added server unit is a server unit added during the expansion, and similarly, is not essentially different from the server units deployed in the server cluster before the expansion.

Details of description about the newly added server unit can be referenced to the description about the server unit at S202 above. Correspondingly, details of description about the newly added node can be referenced to the description about the node included in the server unit at S202 above, and details thereof are not redundantly described herein.

It should be noted that the current operation deploys the at least one newly added server unit into the server cluster in a specific deployment manner only, and the newly added server unit is not functionally implemented. The newly added server unit implements the same function as the server unit only by performing S206 as described below.

S206 broadcasts routing information of the newly added server unit.

In the current operation, the newly added server unit implements the same function as the one or more server units by posting the routing information of the newly added server unit.

For example, in the server cluster 500 as shown in FIG. 5, a new server unit 501 is added on a basis of on the server cluster 300 as shown in FIG. 3. Under the circumstances that the node 301-1, the node 301-2, the newly added node 501-1, and the newly added node 501-2 are machines with the same configuration, the processing performance and the number of sessions of the server cluster are both doubled after the new node 501-1 and the new node 501-2 are added, as compared with those before the addition.

If the processing performance of each of the node 301-1, the node 301-2, the newly added node 501-1, and the newly added node 501-2 is 200 G, and the number of sessions thereof is A, the processing performance of the server cluster is 400 G, and the number of sessions thereof is A before the newly added node 501-1 and the newly added node 501-2 are added. After the newly added node 501-1 and the newly added node 501-2 are added, the processing performance is enhanced to 400 G, and the number of sessions is enhanced to A*2.

In the server cluster 600 as shown in FIG. 6, two new server units, namely, a new server unit 601 and a new server unit 602, are added on a basis of the server cluster 400 as shown in FIG. 4. After the new server unit 601 and the new server unit 602 are added, the number of sessions of the server cluster is doubled.

As described above, according to the implementations of the disaster recovery unit at S202 above, after the new server unit is added to the server cluster and the newly added server unit implements the same function as the one or more server units, a disaster recovery relationship between the server units or between newly added server units in the server cluster changes. The newly added server unit may be set as a disaster recovery unit of the server unit(s), and a disaster recovery unit of the newly added server unit may be configured. In implementations, after the current operation is executed, an operation of posting routing information of the server unit is executed, i.e., routing information of the server unit is re-posted.

In implementations, routing information of each server unit in the server cluster may include respective routing configuration information of each node included in the server unit, and routing information of a disaster recovery unit of the server unit. Correspondingly, the routing information of each newly added server unit may include respective routing configuration information of each newly added node included in the newly added server unit, and routing information of a disaster recovery unit of the newly added server unit.

In implementations, the routing configuration information may include an IP address.

It should be noted that IP addresses included in respective routing configuration information of nodes belonging to the same server unit are the same IP address. Correspondingly, IP addresses included in respective routing configuration information of newly added nodes belonging to the same newly added server unit are the same IP address.

For example, the node 301-1 and the node 301-2 undertake traffic from the IP address 1.1.1.1, and the newly added node 501-1 and the newly added node 501-2 undertake traffic from the IP address 2.2.2.2 in the server cluster 500 as shown in FIG. 5.

As described above, a disaster recovery relationship between the server units, a disaster recovery relationship between the server unit and the newly added priority unit, and a disaster recovery relationship between the newly added priority units in the server cluster are implemented by setting routing priorities. Therefore, routing information of each server unit in the server cluster may further include a routing priority of a first respective node in the server unit and a routing priority of a second respective node in the server unit. Moreover, the routing priority of the first respective node in the server unit is higher than the routing priority of the second respective node in the server unit. Correspondingly, routing information of each newly added server unit may further include a routing priority of a third respective node in the newly added server unit and a routing priority of a fourth respective node in the newly added server unit. Moreover, the routing priority of the third respective node in the newly added server unit is higher than the routing priority of the fourth respective node in the newly added server unit.

In implementations, a disaster recovery unit of each server unit in the server cluster may include any server unit in the server cluster other than the server unit or any newly added server unit. Correspondingly, a disaster recovery unit of each newly added server unit in the server cluster may include any server unit in the server cluster other than the newly added server unit, or any other newly added server unit.

For example, the newly added server unit 501 is configured to be a disaster recovery unit of the server unit 301, and the server unit 301 is set to be a disaster recovery unit of the newly added server unit 501 in the server cluster 500 as shown in FIG. 5.

In the server cluster 600 as shown in FIG. 6, disaster recovery is performed in a manner as follows: server unit 401→server unit 402→newly added server unit 601→newly added server unit 602→server unit 401. Specifically, the server unit 402 is set as a disaster recovery unit of the server unit 401, the newly added server unit 601 is set as a disaster recovery unit of the server unit 402, the newly added server unit 602 is set as a disaster recovery unit of the newly added server unit 601, and the server unit 401 is set as a disaster recovery unit of the newly added server unit 602.

Accordingly, during an expansion of a server cluster to be expanded, the example method configures at least two nodes deployed in the server cluster as one or more server units each consisting of at least two nodes. After configuration of the nodes deployed in the server cluster is finished, the method configures a newly added node into the server cluster and configures the newly added node as at least one newly added server unit in the server cluster, to implement deployment of the newly added server unit into the server cluster. By posting routing information of the newly added server unit, the newly added server unit implements the same function as the one or more server units in the server cluster. In this way, the number of sessions and the processing performance of the expanded server cluster can be improved, and the expansion cost is relatively low.

Second Embodiment

Figure 7:
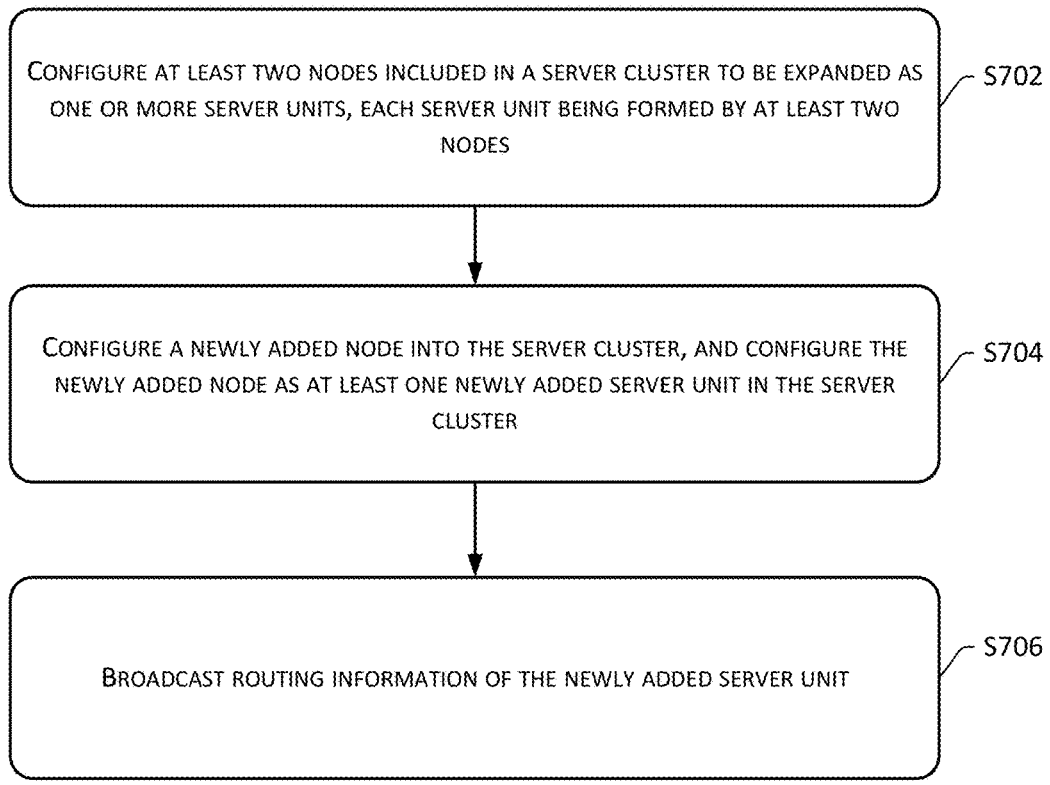
FIG. 7 is a flowchart of a second method for expanding a high-availability server cluster according to the present disclosure.
Figure 8:
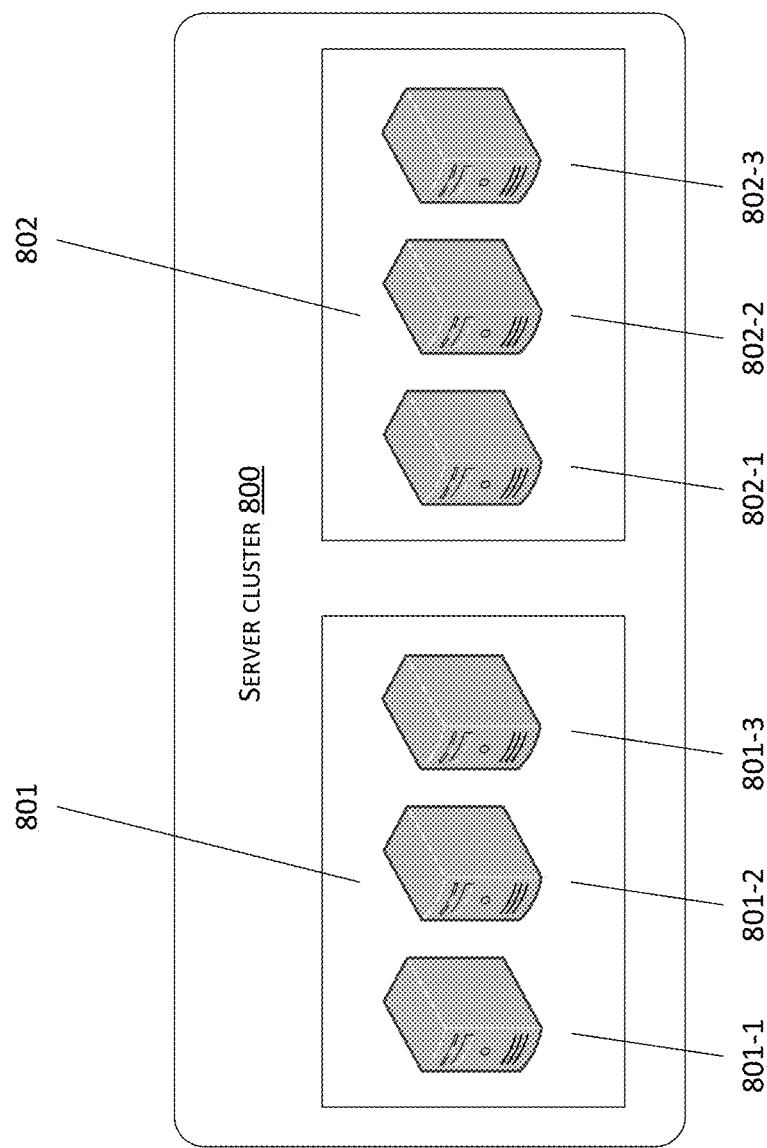
FIG. 8 is a schematic diagram of a fifth high-availability server cluster according to the present disclosure.
Figure 9:
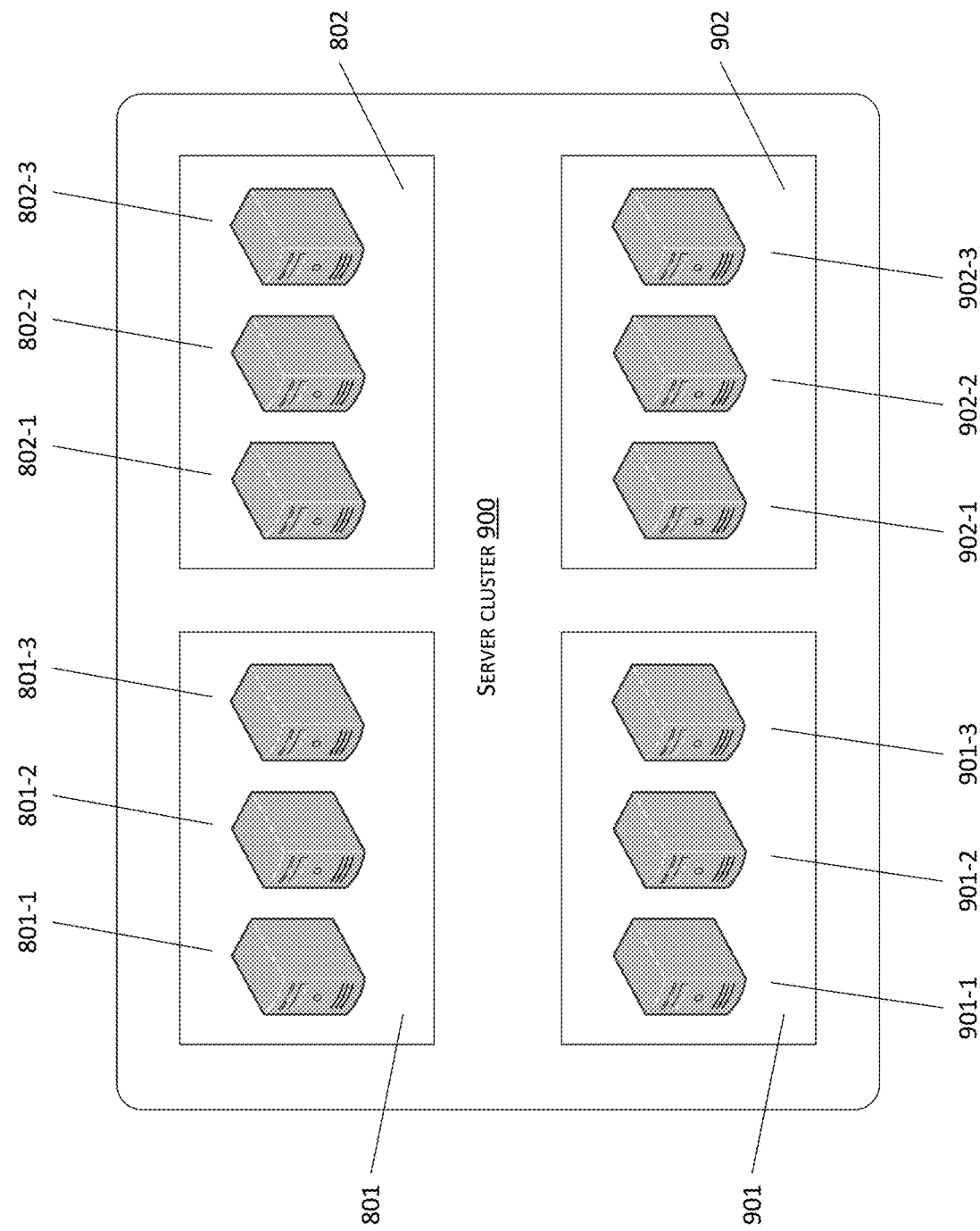
FIG. 9 is a schematic diagram of a sixth high-availability server cluster according to the present disclosure.

Refer to FIG. 7 to FIG. 9, FIG. 7 shows a flowchart of a second example method for expanding a high-availability server cluster according to the present disclosure. FIG. 8 shows a schematic diagram of a fifth high-availability server cluster 800 according to the present disclosure, and FIG. 9 shows a schematic diagram of a sixth high-availability server cluster 900 according to the present disclosure.

Since the present embodiment is relatively similar to the foregoing embodiment, the portions of the present embodiment that are the same as the foregoing embodiment are not repeatedly described herein, and can be referenced to the description of the corresponding portions of the foregoing embodiment.

FIG. 7 shows a flowchart of a second example method 700 for expanding a server cluster according to the present disclosure.

S702 configures at least two nodes included in a server cluster to be expanded as one or more server units, each server unit being formed by at least two nodes.

In a server cluster 800 as shown in FIG. 8, a node 801-1, a node 801-2, and a node 801-3 are configured as a server unit 801. The node 801-1, the node 801-2, and the node 801-3 are all in an active state, and session synchronization is maintained among the node 801-1, the node 801-2, and the node 801-3 to guarantee the high availability of the server unit 801.

A node 802-1, a node 802-2, and a node 802-3 are configured as a server unit 802. The node 802-1, the node 802-2, and the node 802-3 are all in an active state, and session synchronization is maintained among the node 802-1, the node 802-2, and the node 802-3 to guarantee the high availability of the server unit 802.

In addition, the server unit 801 and the server unit 802 are disaster recovery units of each other. When one of the server units fails, traffic on the server unit that breaks down is switched to another server unit in the active state, thus guaranteeing the high availability of traffic of the server cluster.

S704 configures newly added node(s) into the server cluster, and configure the newly added node(s) as at least one newly added server unit in the server cluster.

In a server cluster 900 as shown in FIG. 9, six newly added nodes, namely, a newly added node 901-1, a newly added node 901-2, a newly added node 901-3, a newly added node 902-1, a newly added node 902-2, and a newly added node 902-3, are added on a basis of the server cluster 900 as shown in FIG. 8.

The newly added node 901-1, the newly added node 901-2, and the newly added node 901-3 are configured as a newly added server unit 901. The newly added node 902-1, the newly added node 902-2, and the newly added node 902-3 are configured as a newly added server unit 902.

S706 posts routing information of the at least one newly added server unit.

After routing information of the newly added server unit 901 and the newly added server unit 902 is posted, the newly added server unit 901 and the newly added server unit 902 implement the same function as the server unit 801 or the server unit 802. The newly added node 901-1, the newly added node 901-2, and the newly added node 901-3 included in the newly added server unit 901 are all in the active state. Session synchronization is maintained among the newly added node 901-1, the newly added node 901-2, and the newly added node 901-3 to guarantee the high availability of the newly added server unit 901.

Similarly, the newly added node 902-1, the newly added node 902-2, and the newly added node 902-3 included in the newly added server unit 902 are all in the active state. Session synchronization is maintained among the newly added node 902-1, the newly added node 902-2, and the newly added node 902-3 to guarantee the high availability of the newly added server unit 902.

After the newly added server unit 901 and the newly added server unit 902 are added to the server cluster, a disaster recovery relationship in the server cluster changes, and disaster recovery is performed in a manner as follows: the server unit 801→the server unit 802→the newly added server unit 901→the newly added server unit 902→the server unit 801. Specifically, the server unit 802 is set as a disaster recovery unit of the server unit 801, the newly added server unit 901 is set as a disaster recovery unit of the server unit 802, the newly added server unit 902 is set as a disaster recovery unit of the newly added server unit 901, and the server unit 801 is set as a disaster recovery unit of the newly added server unit 902.

An embodiment of an apparatus for expanding a high-availability server cluster provided by the present disclosure is given as follows.

In the foregoing embodiments, the methods for expanding a high-availability server cluster are provided. In correspondence with the methods, the present disclosure further provides an apparatus for expanding a high-availability server cluster, which is described herein with reference to the accompanying drawings.

Figure 10:
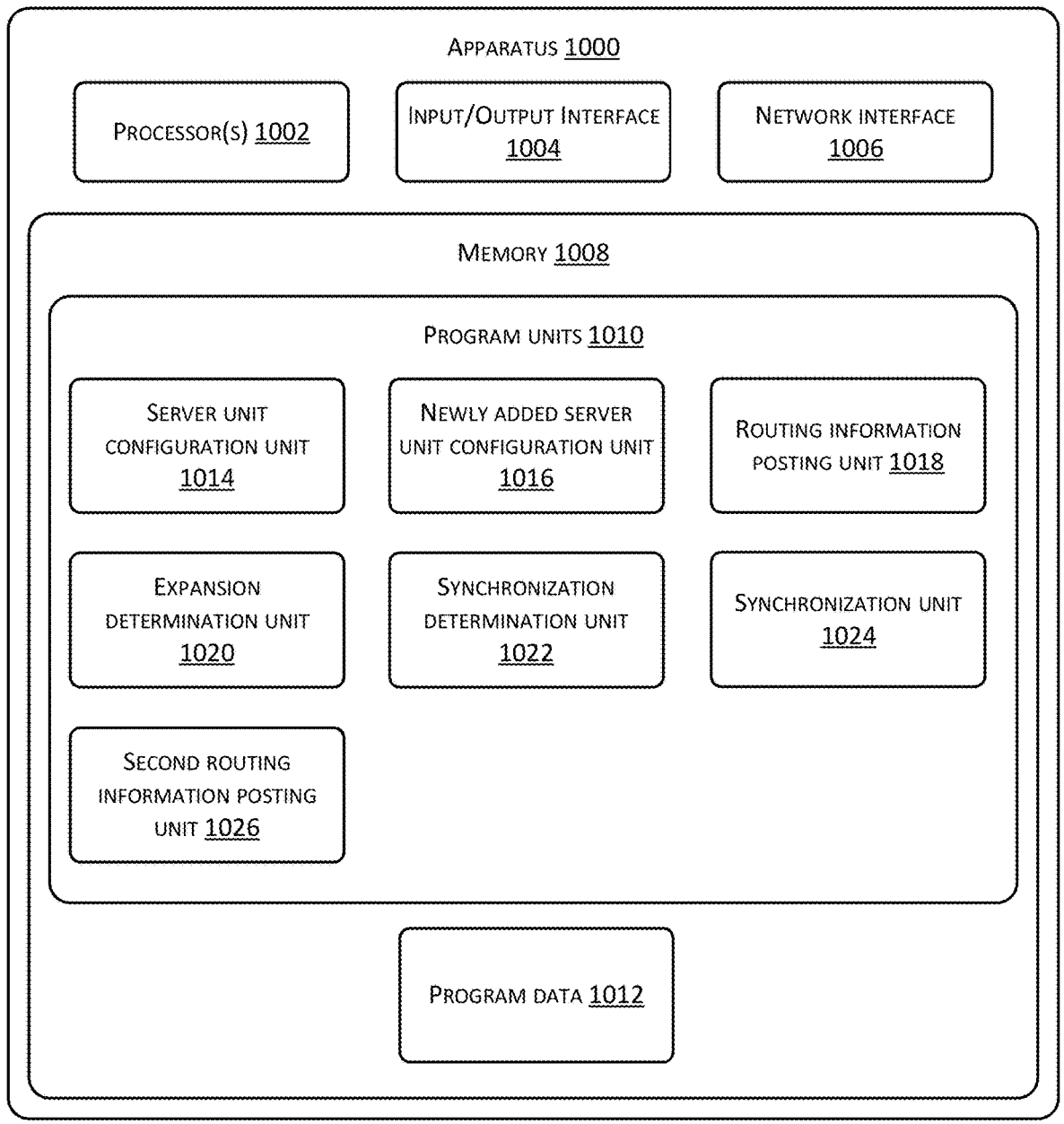
FIG. 10 is a schematic diagram of an example apparatus for expanding a high-availability server cluster according to the present disclosure.

FIG. 10 shows a schematic diagram of an example apparatus 1000 for expanding a high-availability server cluster in accordance with the present disclosure.

Because of the similarity to the method embodiments, the apparatus embodiment is described in a relatively simple manner Related portions may be referenced to corresponding description of the method embodiment as provided above. The apparatus embodiment described herein is merely illustrative.

The present disclosure provides the apparatus 1000 for expanding a high-availability server cluster, which may include one or more processors 1002, an input/output interface 1004, a network interface 1006, and memory 1008.

The memory 1008 may include a form of computer-readable media, e.g., a non-permanent storage device, random-access memory (RAM) and/or a nonvolatile internal storage, such as read-only memory (ROM) or flash RAM. The memory 1008 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 1008 may include program units 1010 and program data 1012. The program units 1010 may include a server unit configuration unit 1014 configured to configure at least two nodes included in a server cluster to be expanded as one or more server units, each server unit consisting of at least two nodes; a newly added server unit configuration unit 1016 configured to configure a newly added node into the server cluster, and configuring the newly added node as at least one newly added server unit in the server cluster; and a routing information posting unit 1018 configured to broadcast routing information of the newly added server unit.

In implementations, the apparatus 1000 may further include an expansion determination unit 1020 configured to determine whether a performance parameter of the server cluster is greater than a preset performance parameter threshold based on the performance parameter, and run the server unit configuration unit 1014, the newly added server unit configuration unit 1016, and the routing information posting unit 1018 if affirmative, or run the expansion determination unit 1020 if not.

In implementations, the performance parameter may include the number of sessions and/or load pressure.

In implementations, a respective unit identifier is set for each server unit, and correspondingly, a respective unit identifier is set for each newly added server unit.

In implementations, for each node to be synchronized or newly added node in the server cluster, a synchronization determination unit 1022 is run.

The synchronization determination unit 1022 is configured to determine whether a unit identifier of a server unit or newly added server to which a node or newly added node to be synchronized belongs is the same as a unit identifier of a server unit or newly added server to which a node or newly added node that has been synchronized belongs.

If affirmative, a synchronization unit 1024 is run, the synchronization unit 1024 being configured to synchronize a session and corresponding data on the synchronized node or newly added node to the node to be synchronized or newly added node.

If not, the synchronization determination unit 1022 is run.

In implementations, the apparatus 1000 may further include a second routing information posting unit 1026 configured to post routing information of the server unit(s).

In implementations, routing information of each server unit in the server cluster may include respective routing configuration information of each node included in the server unit, and routing information of a disaster recovery unit of the server unit.

Correspondingly, routing information of each newly added server unit may include respective routing configuration information of each newly added node included in the newly added server unit, and routing information of a disaster recovery unit of the newly added server unit.

In implementations, the routing configuration information may include an IP address.

In implementations, IP addresses included in respective routing configuration information of nodes belonging to a same server unit are a same IP address.

Correspondingly, IP addresses included in respective routing configuration information of newly added nodes belonging to a same newly added server unit are a same IP address.

In implementations, in the server cluster, the routing information of each server unit may further include a routing priority of a first respective node in the server unit and a routing priority of a second respective node in the server unit.

Correspondingly, the routing information of each newly added server unit may further include a routing priority of a third respective node in the newly added server unit and a routing priority of a fourth respective node in the newly added server unit.

In implementations, the routing priority of the first respective node in the server unit is higher than the routing priority of the second respective node in the server unit.

Correspondingly, the routing priority of the third respective node in the newly added server unit is higher than the routing priority of the fourth respective node in the newly added server unit.

In implementations, the disaster recovery unit of the server unit may include any server unit in the server cluster other than the server unit or any newly added server unit.

Correspondingly, the disaster recovery unit of the newly added server unit may include any server unit in the server cluster other than the newly added server unit, or any other newly added server unit.

In implementations, each server unit in the server cluster includes an equal number of nodes.

In implementations, each newly added server unit in the server cluster includes an equal number of newly added nodes.

In implementations, a number of nodes included in each server unit is equal to a number of newly added nodes included in each newly added server unit.

In implementations, a number of server units in the server cluster is one, and each time when the newly added server unit configuration unit 1016 is run, a number of newly added server units in the server cluster is increased by one.

Although the present disclosure is described using exemplary embodiments above, the exemplary embodiments are not intended to limit the present disclosure. One skilled in the art can make possible variations and modifications without departing from the spirit and scope of the present disclosure. Therefore, the scope of protection of the present disclosure shall be subject to the scope defined by the claims of the present disclosure.

In a typical configuration, a computing device includes one or more Central Processing Units (CPUs), an I/O interface, a network interface, and memory.

The memory may include a form of computer-readable media, e.g., a non-permanent storage device, random-access memory (RAM) and/or a nonvolatile internal storage, such as read-only memory (ROM) or flash RAM. The memory is an example of computer-readable media.

1. The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

2. One skilled in the art should understand that the embodiments of the present disclosure may be provided as a method, a system, or a computer program product. Therefore, the present disclosure may be implemented as a complete hardware embodiment, a complete software embodiment, or an embodiment that is a combination of software and hardware. Moreover, the present disclosure may be a computer program product implemented on one or more computer usable storage media (including, but not limited to, a magnetic disk memory, a CD-ROM, an optical memory, and the like) including computer usable program codes.

The invention claimed is:

1. A method comprising:
   determining whether a number of sessions of a server cluster is greater than a preset threshold;
   configuring a plurality of nodes included in the server cluster to be expanded as one or more server units in response to determining that the number of sessions of the server cluster is greater than the preset threshold, each server unit of the one or more server units including at least two nodes and configured with a first number of sessions synchronized between the at least two nodes in the server unit;
   configuring a newly added node into the server cluster, and configuring the newly added node as at least one newly added server unit in the server cluster to include at least two nodes and with a second number of sessions synchronized between the at least two nodes in the newly added server unit; and
   posting routing information of the newly added server unit.

2. The method of claim 1, further comprising:
   updating the number of sessions of the server cluster with the first numbers of sessions associated with the one or more server units and the second number of session associated with the newly added server unit; and
   returning and re-performing the determining of whether the updated number of sessions of the server cluster is greater than the preset threshold if not.

3. The method of claim 1, further comprising setting a respective unit identifier for each server unit of the one or more server units, and another respective unit identifier for each newly added server unit of the at least one newly added server unit.

4. The method of claim 1, further comprising posting routing information of the one or more server units after posting the routing information of the newly added server unit.

5. The method of claim 1, wherein the routing information of the at least one newly added server unit comprises respective routing configuration information of each newly added node included in the at least one newly added server unit, and routing information of a respective disaster recovery unit of the at least one newly added server unit.

6. The method of claim 5, wherein nodes belonging to a same server unit include a same IP address.

7. The method of claim 6, wherein the routing information of the at least one newly added server unit further comprises a respective routing priority of the at least one added server unit.

8. The method of claim 1, further comprising configuring a disaster recovery unit for a server unit of the one or more server units, the disaster recovery unit of the server unit comprises any one of the at least one newly added server unit or the one or more server units other than the server unit.

9. The method of claim 1, wherein a number of nodes included in each server unit of the one or more server units are different from a number of newly added nodes in each of the at least one newly added server unit.

10. The method of claim 1, wherein a number of nodes included in each of the one or more server units is equal to a number of newly added nodes included in each of the at least one newly added server unit.

11. One or more computer-readable media storing executable instructions that, when executed by one or more processors, cause the one or more processors to perform acts comprising:
   determining whether a number of sessions of a server cluster is greater than a preset threshold;
   configuring a plurality of nodes included in the server cluster to be expanded as one or more server units in response to determining that the number of sessions of the server cluster is greater than the preset threshold, each server unit of the one or more server units including at least two nodes and configured with a first number of sessions synchronized between the at least two nodes in the server unit;

configuring a newly added node into the server cluster, and configuring the newly added node as at least one newly added server unit in the server cluster to include at least two nodes and with a second number of sessions synchronized between the at least two nodes in the newly added server unit; and posting routing information of the newly added server unit.

12. The one or more computer-readable media of claim 11, the acts further comprising:

updating the number of sessions of the server cluster with the first numbers of sessions associated with the one or more server units and the second number of session associated with the newly added server unit; and returning and re-performing the determining of whether the updated number of sessions of the server cluster is greater than the preset threshold if not.

13. The one or more computer-readable media of claim 11, wherein the routing information of the at least one newly added server unit comprises respective routing configuration information of each newly added node included in the at least one newly added server unit, and routing information of a respective disaster recovery unit of the at least one newly added server unit.

14. The one or more computer-readable media of claim 13, wherein the routing information of the at least one newly added server unit further comprises a respective routing priority of the at least one added server unit.

15. The one or more computer-readable media of claim 11, further comprising configuring a disaster recovery unit for a server unit of the one or more server units, the disaster recovery unit of the server unit comprises any one of the at least one newly added server unit or the one or more server units other than the server unit.

16. An apparatus comprising:

one or more processors;

memory coupled to the one or more processors, the memory storing a plurality of executable modules, executable by the one or more processors that when executed by the one or more processors causes the one or more processors to perform acts including:

determining whether a number of sessions of a server cluster is greater than a preset threshold;

configuring at least two nodes comprised in the server cluster to be expanded as one or more server units in response to determining that the number of sessions of the server cluster is greater than the preset threshold, each server unit including at least two nodes and configured with a first number of sessions synchronized between the at least two nodes in the server unit;

configuring a newly added node into the server cluster, and configuring the newly added node as at least one newly added server unit in the server cluster to include at least two nodes and with a second number of sessions synchronized between the at least two nodes in the newly added server unit; and posting routing information of the newly added server unit.

17. The apparatus of claim 16, wherein the memory when executed by the one or more processors, further causes the one or more processors to perform acts including:

updating the number of sessions of the server cluster with the first numbers of sessions associated with the one or more server units and the second number of session associated with the newly added server unit; and returning and re-performing the determining of whether the updated number of sessions of the server cluster is greater than the preset threshold if not.

18. The apparatus of claim 16, wherein the routing information of the at least one newly added server unit comprises respective routing configuration information of each newly added node included in the at least one newly added server unit, routing information of a respective disaster recovery unit of the at least one newly added server unit, and a respective routing priority of the at least one added server unit.

* * * * *